March 29, 1932.  O. A. WHEELER  1,851,555
TIRE CARCASS AND RUBBER RECLAIMING MACHINE
Filed May 31, 1929  4 Sheets-Sheet 1

Omar A. Wheeler
INVENTOR

BY
Thomas Bilyeu
ATTORNEY

March 29, 1932. O. A. WHEELER 1,851,555
TIRE CARCASS AND RUBBER RECLAIMING MACHINE
Filed May 31, 1929 4 Sheets-Sheet 3
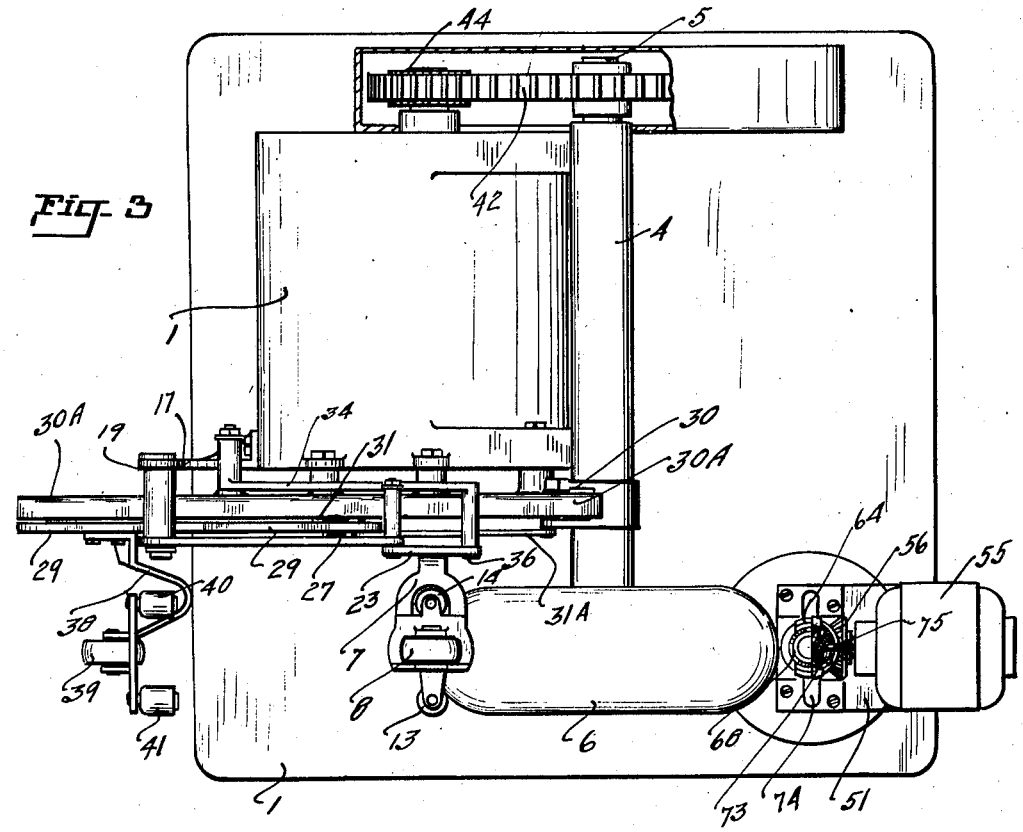
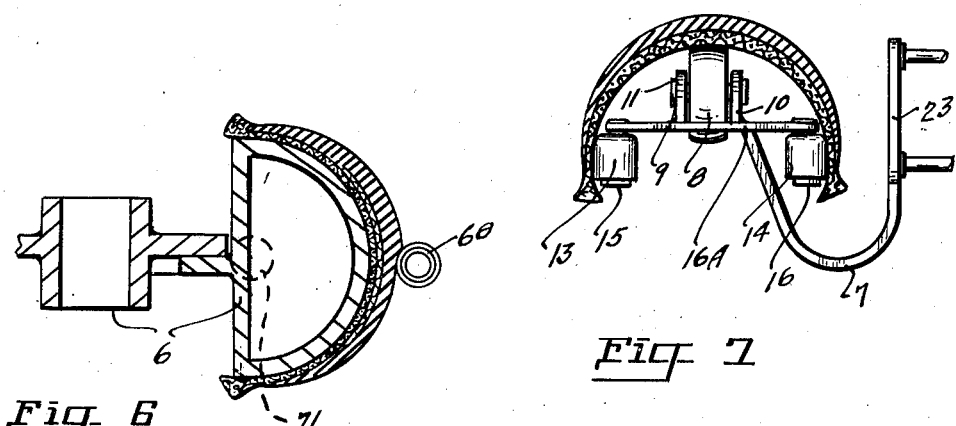
Omar A. Wheeler
INVENTOR
BY
ATTORNEY

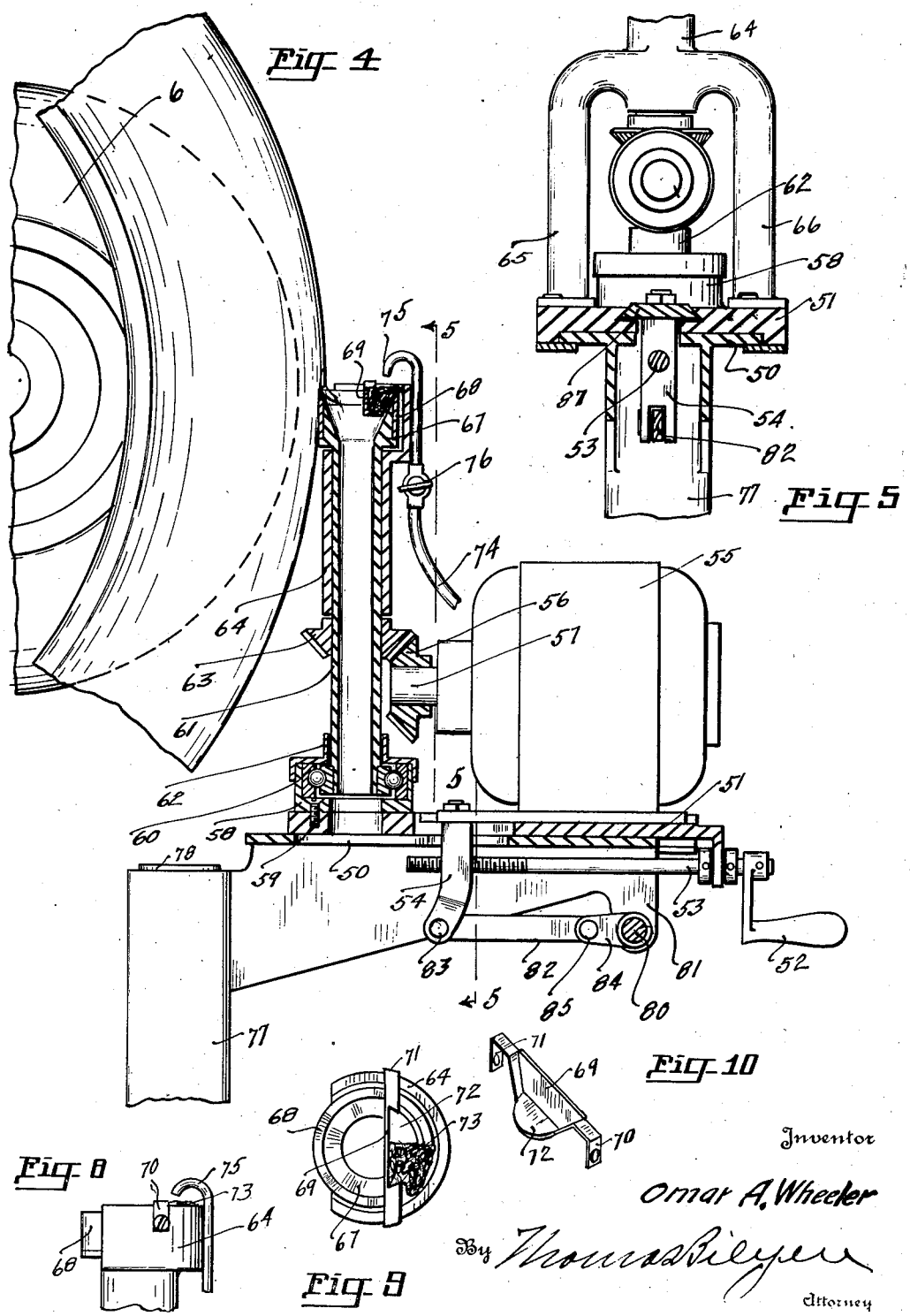

Patented Mar. 29, 1932

1,851,555

UNITED STATES PATENT OFFICE

OMAR A. WHEELER, OF PORTLAND, OREGON

TIRE CARCASS AND RUBBER RECLAIMING MACHINE

Application filed May 31, 1929. Serial No. 367,481.

This invention relates to the treatment of discarded pneumatic tires either at the factory in the treatment of tires not meeting with standards of perfection of the company manufacturing the same or for use in the reclaiming of worn tires. The primary object of the invention is to reclaim, or recondition the carcass of the tire for reuse as for retreading purposes or for use as reliners or in the manufacturing of boots, insoles and the like.

A further primary object of the invention is for the reclaiming of the rubber in highly usable form which consists primarily in the cutting of the tread portion of the tire into ribbon-like strips.

Heretofore it has been the general custom to pull the tread portion of the tire from the tire carcass which was a laborious task and which had a tendency to destroy the carcass portion of the tire. The reclaimed rubber was also not in as highly usable form as is obtained through the use of my device.

In the reconditioning of the tread portion of the tire it is essential that the carcass remain in a uniform condition of thickness and be treated in a manner to leave such portions of the fabric or cord as are to be used imbedded and impregnated within the rubber protecting coating. This is satisfactorily accomplished by the mechanism shown, described and claimed in my specification.

In my new and improved device I mount the tire to be treated upon an expansible rotating element and provide means for driving the same. The device, in preferred embodiment, consists of an annular driven wheel over which the tire to be treaded is placed. A plurality of other supports are mounted upon a frame with means for adapting the supports to the inner surface of the tire so that the same may be substantially stressed to facilitate the rotation of the driving wheel and of the tire, the tire being driven by frictional engagement with the driving wheel. A removable cylindrical, lubricated cutter-head is arranged tangential, or substantially tangential, of the wheel and is arranged for engaging the tread portion of the tire and for being manually fed in driven engagement with the tread portion of the tire to cut the tread portion from the tire in strips or ribbons. The cutter-head is power driven and manually manipulated. The supports for the tire carcass are of a shape and size to expand the smaller of the tires to increase their cross-sectional diameter to that of the largest tire to which the driving wheel is to be used. The ribbon cut from the tire carcass is permitted to flow through the internal passage disposed within the cutter-head. Simple means are provided to facilitate the removal of the cylindrical cutter blade from the driven head. The same is adapted to the driving head to facilitate a quick change of the cutter-head from the driving head.

I preferably form my device of a rigid, framed structure to which the associated moving parts are supported. The power units for driving the mechanisms are removably disposed upon and within the frame, in order to compose a completely assembled unit that will be compact and easily moved.

One of the primary objects of my device is to reclaim the tire treads of used tires and to remove the reclaimed rubber in ribbon form in order that the same may be easily and uniformly treated for reuse.

A further object is to leave the tire carcass in uniform shape and condition in order that the same may be retreaded to give uniform results. Heretofore the methods employed in the reclaiming of the tire tread have not left the tire carcass in uniform condition. By the old methods of tread removal, the retreading of the tire carcasses did not produce tires of uniform size, appearance and homogeneity.

By my new and improved process the tire carcass is not permanently distorted and the methods and devices employed in the detreading process produce a tire carcass of uniform surface condition.

A further object of my invention is to provide a machine that will rapidly remove and reclaim, in usable form, the tread portion of the tire.

A still further object of my invention consists in providing means for the reclaiming of a tire carcass that leaves the tire carcass in uniform surface condition and that do not in any way disrupt or destroy the component elements comprising the same.

A still further object of my invention resides in a machine that may be operated with a minimum of mechanical skill and with a minimum of personal labor or effort.

A further object of my device resides in a structure, to which the tire to be treaded, may be adapted and removed with a minimum of time and labor.

A further object resides in a structure that will completely recondition the tire carcass for retreading in a minimum amount of time and that will reclaim the tire tread in uniform usable condition.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings:

Fig. 3 is a top, plan view of the assembled device.

Fig. 4 is a fragmentary, sectional, side view of the cutter-head, the driving elements therefor, and of the driving wheel over which the tire is placed and stressed.

Fig. 5 is a sectional, side view, of the cutter-head and the driving mechanism therefore, the same being taken on line 5—5 of Fig. 4 looking in the direction indicated.

Fig. 6 is a sectional view of the rim of the driving wheel illustrating a tire disposed thereupon and illustrating the cutter-head in engagement with the tread portion of the tire.

Fig. 7 is a side view of one other of the supporting wheels or heads adapted for engagement with the inside surface of the tire and illustrating a tire in cross section disposed thereupon.

Fig. 8 is a fragmentary, side view of the cutter-head illustrating means for lubricating or moistening the same.

Fig. 9 is a top, plan view of the cutter-head illustrating a shield disposed therein for retaining a moisture holding fabric that engages the inner surface of the cutter head and lubricates the same.

Fig. 10 is a perspective, rear, side view of the shield disposed within the cutter-head.

Like reference characters refer to like parts throughout the several views.

Figure 2:
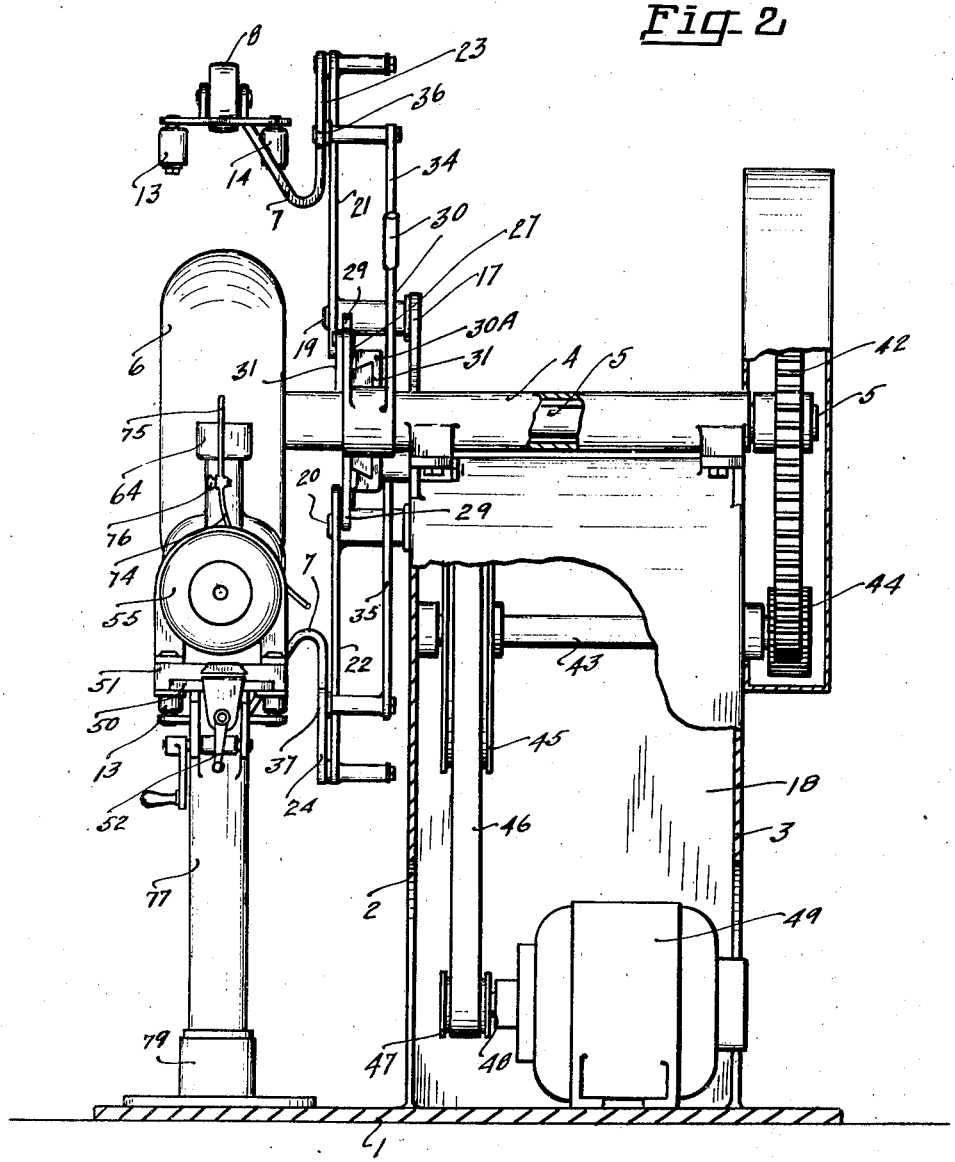
Fig. 2 is a front, end view, partially in section of the assembled device.

I preferably form my device of a frame having a base 1, upwardly extending end walls 2 and 3 and having side walls formed integral therewith to form a boxlike structure disposed upon the base. A journaled bearing 4 is disposed horizontally within the frame through which a driven main shaft 5 passes. A driving wheel 6 is disposed upon one end of the shaft 5 over which the tire carcass to be treated is placed and stressed. The diameter of the driving wheel 6 is substantially smaller than the diameter of the smallest tire to be treated, in order that the driving wheel may be made to adapt itself to the smallest and largest sizes of pneumatic tires. Disposed in driving alignment with that of the driving wheel 6, are a plurality of supporting heads two of which are made as illustrated in Fig. 7. The head consists of a goose-neck support 7 and has a central wheel 8 rotatably mounted upon a journal pin 9 disposed within bosses 10 and 11. Side wheels 13 and 14 engage the inner side wall portions of the tire and the wheel 8 engages the inner central portion of the tire. The wheels 8, 13 and 14 are so placed in spaced relationship as to fit substantially the cross section of the rim of the driving wheel 6. The side wheels 13 and 14 are journaled upon journal pins 15 and 16 that are secured to the cross bar 16A of the support 7. A bracket 17 is disposed and outwardly extends from the rear wall 18 of the frame and stub shafts 19 and 20 are disposed within the bracket. Bell crank arms 21 and 22 are pivotally disposed about the stub shafts 19 and 20. The outer end of the arms 21 and 22 carry the head frames 23 and 24 on which the wheels 8, 13 and 14 are rotatably supported and the arms 25 and 26 carry camming pins 27 and 28. The adjustable cam head 29 is supported within the head block 30A and a dove-tailed connection is disposed between the camming head and the head block as illustrated at 31 in Fig. 2 and a reciprocating motion is imparted to the camming head 29 by the adjusting lever 30. The adjusting and positioning lever 30 has a link 31A that indirectly connects the lever 30 with the cam head. Positioning slots 32 and 33 are disposed within the camming head into which the pins 27 and 28 engage. Links 34 and 35 connect the wheel supporting heads 23 and 24 through the pin connections 36 and 37 to bosses outwardly extending from the main frame. A bracket 38 is secured to the camming head 29 and the bracket carries a central wheel 39 and side wheels 40 and 41 to create a head similar to that at 23 and 24. I have here shown a plurality of wheeled heads adapted to engage the inner surface of the tire as being three in number, but I do not wish to be limited to three heads as this may be changed as the diameters of tires to be treated increase or decrease. The adjusting and positioning lever 30 should be of a sufficient length to enable the operator to stress the tire being reconditioned and treated to afford a driving, frictional engagement between the tire and the driving wheel 6 to which the driving motive power is applied to rotate the tire for treatment. The bracket 38 supporting the wheels 39, 40 and 41 is fixedly disposed upon the camming head 29 and as the camming head 29 is moved by the hand lever 30 the wheel heads and the wheels secured thereto are made to engage the inner surface of the tire and to tension the tire placed therearound relative to the driving wheel 6 sufficiently to permit the driving wheel 6 to drive the tire in rotation. A driving gear 42 is secured to the shaft 5 and a secondary driving shaft 43 is journaled within suitable bearings in the frame with a pinion 44 secured to the shaft 43, coacting with and driving the main gear 42. A driving pulley 45 is disposed upon the shaft 43 and a driving element 46 is trained around the driving pulley 45 and a driving pulley 47 is disposed upon the armature shaft 48 of the electric motor 49.

Figure 1:
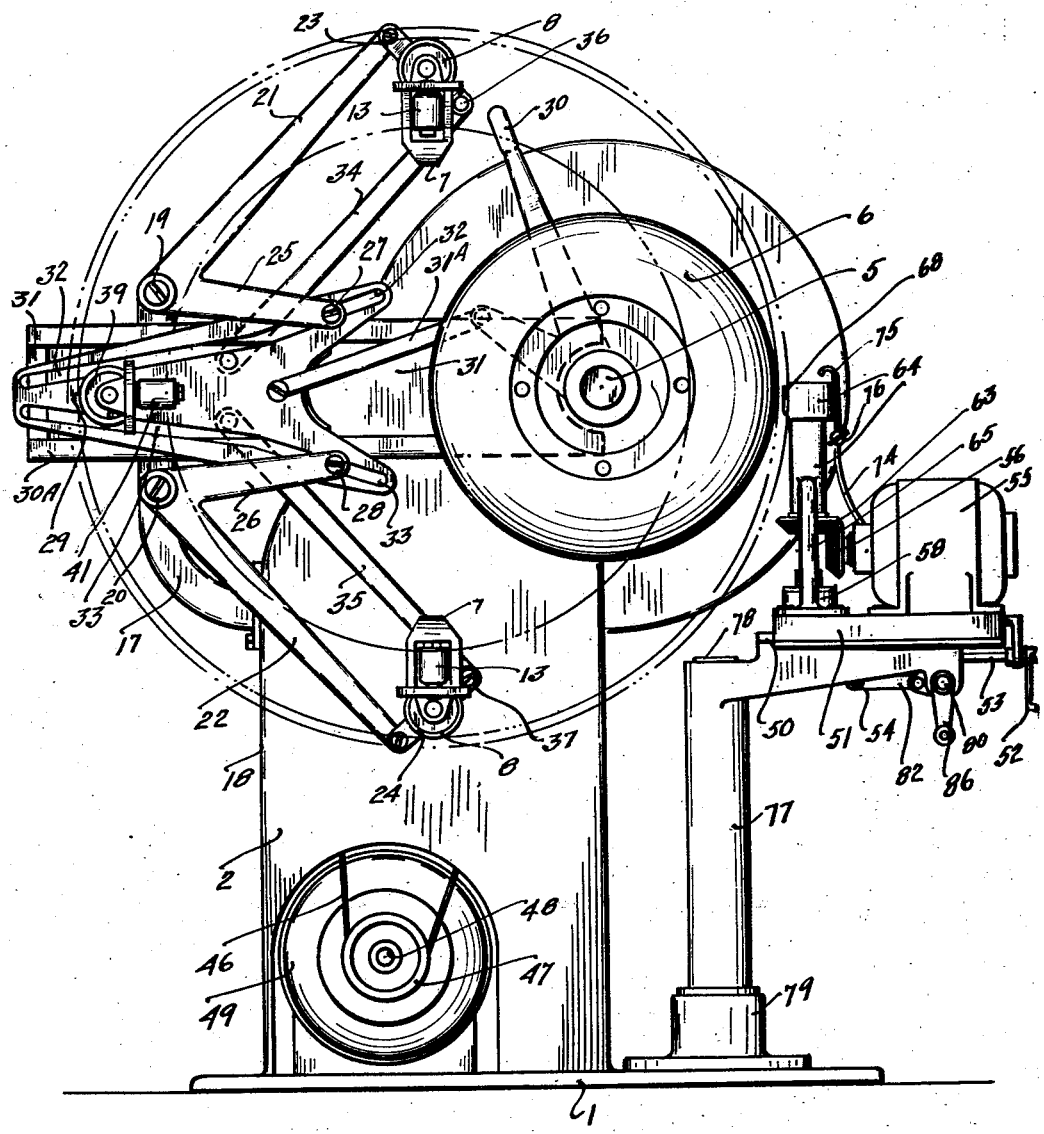
Fig. 1 is a side elevation of the assembled device.

A table 50 terminates the upper end of the sleeve support 77 illustrated in Fig. 1. The table 50 is disposed adjacent the front of the frame of the device and a base 51 is slidably disposed upon the table. The base 51 is adapted to be reciprocated or slid or positioned upon the table 50 through the medium of a crank 52 secured to the outer end of the adjusting screw 53. The adjusting screw 53 engages with the threaded block 54 that is secured to the base 51. An in and out movement is imparted to the base 51 relative to the table 50 through the hand manipulation of the adjusting lever and screw. An electric motor 55 is disposed upon the base 51 and has a beveled driving pinion 56 secured to the armature shaft 57. A bearing hub 58 is attached to the upper surface of the base 51 and is removably secured thereto by countersunk screws 59 and a frictionless bearing 60 is disposed within the hub. A hollow shaft 61 is secured to the frictionless bearing 60 and a cover box 62 covers the frictionless bearing to maintain the same in a clean operating condition. A beveled gear 63 coacts with the driving beveled gear 56 and rotates the hollow shaft 61 and is secured thereto. A housing 64 bifurcated upon its lower end at 65, 66 is secured to the base 51 that acts as a bearing through which the hollow shaft passes and maintains the same in position and alignment. The hollow shaft 61 terminates in a driving head 67 upon its upper end. A cylindrical cutter blade 68 is removably secured to the driving head 67. I have found good results may be obtained wherein the cutter blade is made from cold drawn steel seamless tubing. The character of the work required of the cutter blade is such that frequent changes of the blade are necessary in order to maintain the same in a keen, sharp cutting condition. In the cutting of rubber, it is necessary to maintain the cutting blade in a moist or lubricated condition. I accomplish this result by placing a shield as illustrated in Fig. 10 consisting of a wall 69 that is disposed substantially through the center of the cutting blade having outwardly and downwardly extending ears 70 and 71 that engage the outside of the support for the cutter head and having an inner extending half-circular base 72 upon which a fabric moisture-holding pad 73 is supported. The fabric pad engages the inner surface of the cutter blade and a suitable cutting solution is pumped through the flexible pipe 74 and deposited therefrom through the discharge nozzle 75. A cock 76 is disposed within the pipe line for regulating the quantity of material to be deposited upon the fabric pad. The material cut from the tire in ribbon form by the rotating, cutting blade passes through the hollow shaft and base of the device. The table upon which the motor assembly and cutter and adjusting head is disposed is journaled about the vertical shaft 78 and the shaft 78 is secured (not shown) to the hub 79 that rests upon the base 1 of the device. The shape of the rim of the driving wheel 6 forms the tire, irrespective of the diameter of the tire, since the outer edge of the cross section of the rim of the driving wheel is an arc of a circle so that the inner surface of a tire mounted thereon is brought to substantially the arc of a circle in horizontal cross section and the center line of the supporting journal shaft 78 is disposed substantially vertical to and passing through the radial center of the circle of the rim of the driving wheel 6 so that when the depth of the cut is predetermined by the hand adjusting screw 53, the partial rotation of the cutter head assembly about the shaft 78 causes the cutter head to follow substantially a uniform spaced distance from the outer surface of the driving wheel 6. The cutter head trims the carcass of the tire to a substantial uniform thickness. Any change in thickness that may be required can be accomplished by the positioning of the cutter blade through the adjustment of the cutter head assembly by the manipulation of the adjusting screw 53.

It may be found desirable at times to move or adjust the cutter head and the associated elements at a higher speed than may be obtained quickly through the use of the adjusting handle 52 and the screw 53. To accomplish this I have provided a shaft 80 journaled in a supporting foot 81 downwardly extending from the base 50 and I secure a link 82 to a pin 83 disposed within the lower end of the screw head 54. An arm 84 is secured to the shaft 80 and is hingedly connected to the link 82 through a hinge pin 85. When it is desired to make a quick adjustment of the crank 86 secured to the shaft 80 which breaks the straight line that is normally maintained between the arm 84 and the link 82 thereby moving the whole assembly along the supporting table 50. In order to maintain the assembly in a straight line a dove-tailed connection is disposed between the table 51 and the guide bar 87.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow.

What I claim is:

1. In a device of the class described, the combination of a frame, means disposed upon the frame for mounting a tire thereon, a power driven driving wheel rotatably disposed on the frame for rotating the tire when mounted, a plurality of secondary wheels disposed in driving alignment with the driving wheel and adapted to be placed within the tire being detreaded, means for setting the secondary wheels to adapt them to the diameter of the tire to be detreaded, means for stripping the rubber from the tire, said stripping means adapted to be disposed tangentially of the tire tread, and means for driving the tire past the stripping means.

2. In a device of the class described, the combination of a cutter head removably secured to a hollow driving shaft, means for maintaining the cutter head in a wet condition, means for rotating the hollow driving shaft and the cutter head, means for moving the cutter head toward and away from a tire to be reconditioned, means for moving the cutter head in the arc of a circle concentric with the cross sectional surface of the driving wheel relative to a fixed support and means for driving the tire to be detreaded past the cutter head.

3. In a device of the class described, the combination of a base, means for supporting the base to permit the base to be moved in a horizontal plane in the arc of a circle about the supporting means, a cutter head disposed vertically upon the base, power means for driving the cutter head, means for moving the cutter head along the base, means for supporting a tire so that the radial center of the cross-section coincides with the center of movement of the base and means for driving the tire past the cutter head.

4. In a device of the class described, the combination of adjustable tire supporting means, means for rotating a tire in its normal plane of rotation, a hollow shaft disposed vertically to the tread of the tire, a cutter head disposed about the hollow shaft in tangential relation with the tread of the tire, means for moving the cutter head in an arc of a circle to trim the tread from the tire and adjustable means for moving the cutter head mechanism toward or away from the tread of the tire.

5. In a device of the class described, the combination with a tire cutting means, a body element, a dove-tailed head block horizontally disposed upon the body element, a slotted camming head slidably disposed within the head block, a bracket outwardly extending from and secured to the body element and in vertical relationship with the camming head, bellcranks pivotally journaled to the bracket, said bell cranks having one of their arms slidably disposed within the slots of the camming head, supporting heads secured to the other arm of the bell cranks and another supporting head secured to the camming head, links pivotally journaled to the body element and to the supporting heads, an adjusting lever secured to the camming head, a wheel rotatably disposed upon the body element and in the same plane with the supporting heads adapted for imparting rotation to a tire when the tire is mounted on the mechanism, and means for driving the wheel.

6. In a device of the class described, in combination with an adjustable tire mounting frame adapted to rotatably support a tire with its axis horizontal, a base, a shaft vertically positioned on the base so that it is aligned with the radial center of the arc of a circle made by horizontal cross section through the axis of the tire, a support made integral with the vertical shaft housing, an adjustable base disposed upon the support, a bifurcated housing, a bearing hub disposed therebetween, a hollow shaft vertically disposed within the bearing hub and the bifurcated housing, a driving head disposed upon the hollow shaft, a cutter blade removably secured to the driving head, means for rotating the hollow shaft, means for adjusting the base in the same plane with the tire mounted upon the mounting frame, and means for moving the base in the arc of a circle relative to a fixed support.

7. In a device of the class described, the combination with a tire cutting means, with an adjustable tire mounting frame, supporting heads comprising a goose neck support, a cross bar secured thereto, bosses disposed centrally thereabove, a wheel rotatably journaled therebetween, and side wheels rotatably journaled at each end of and under the cross bar.

8. A shield to be used with a cupped cutter head of the class described, in which the cutter is surrounded by a casing, comprising a body element having an upwardly extending wall, ears made integral with and downwardly extending from the wall adapted to be detachably attached to the cutter head casing, and an inwardly extending half circular base disposed in spaced relation with and within the cutter head casing adapted to form a retaining pocket.

OMAR A. WHEELER.